April 16, 1968  C. M. JACOBS  3,378,279
HITCH MEANS FOR FARM IMPLEMENT
Filed May 13, 1966  2 Sheets-Sheet 1
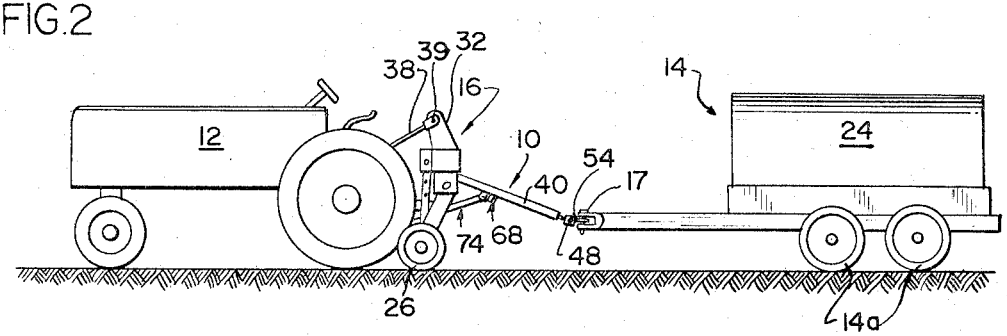
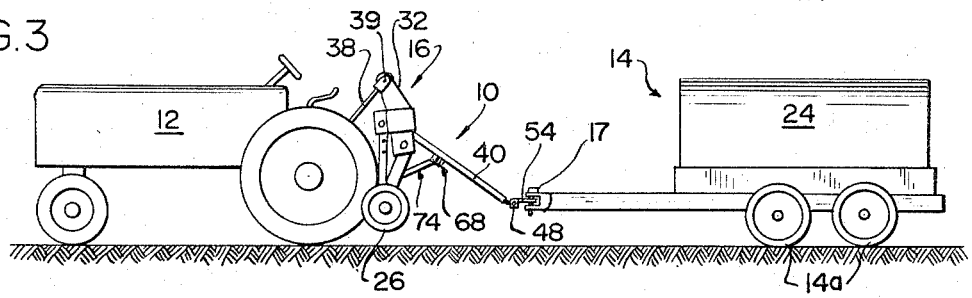
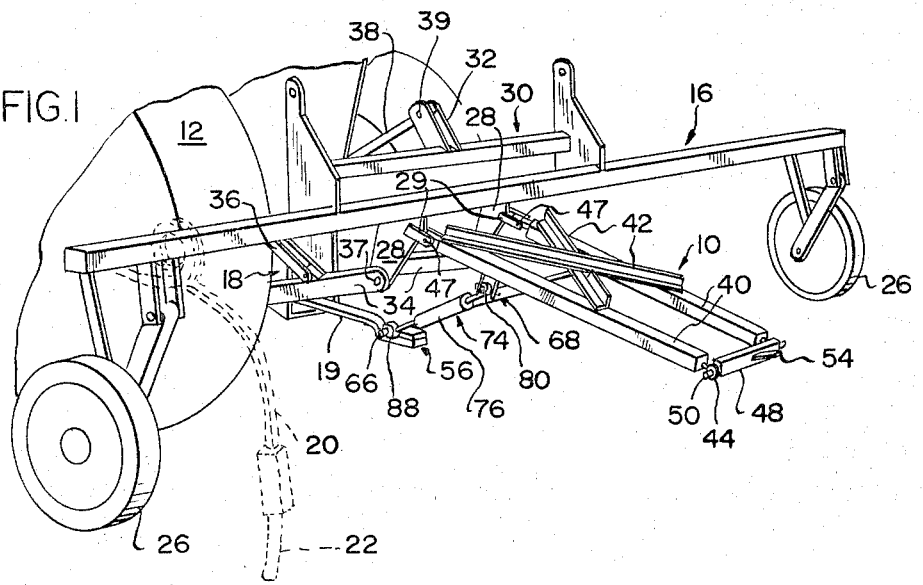
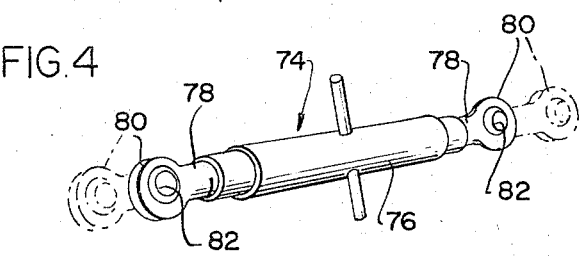
INVENTOR
CARL M. JACOBS
BY Hofgren, Wegner, Allen,
Stellman & McCord
ATTORNEYS

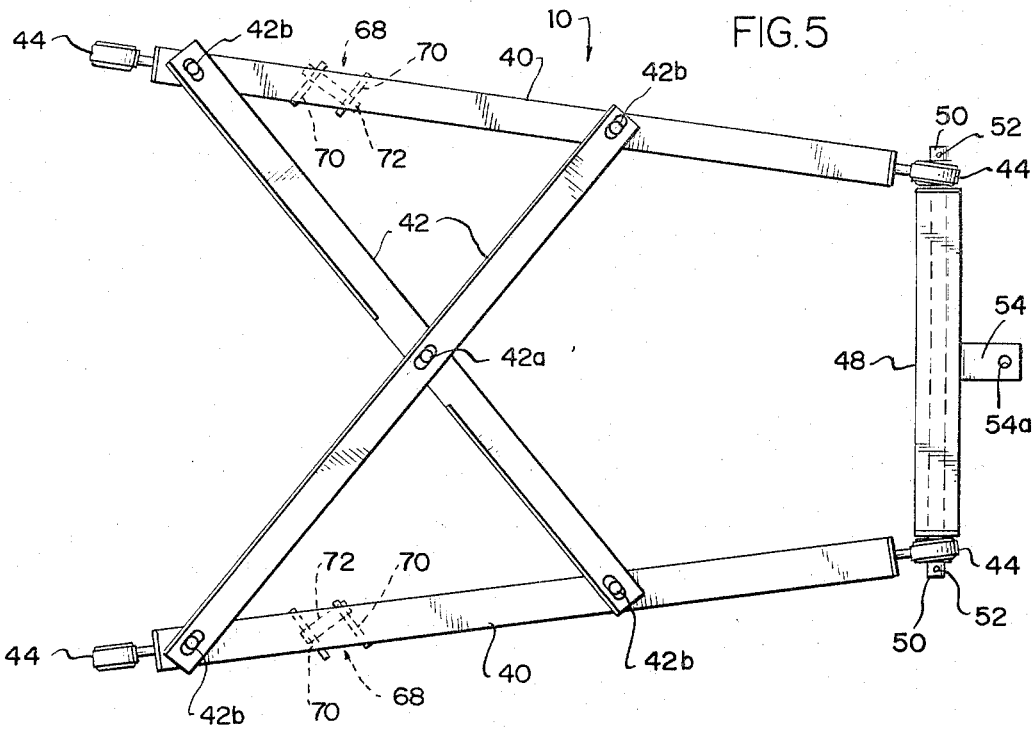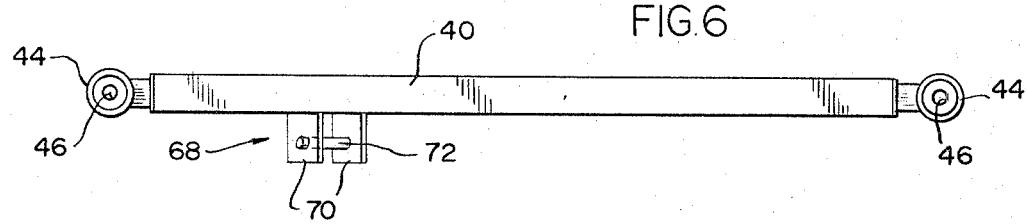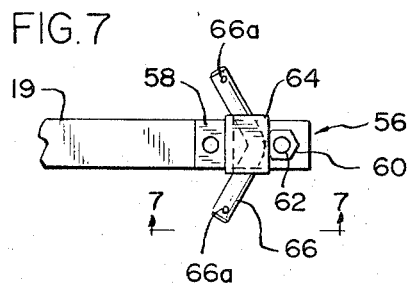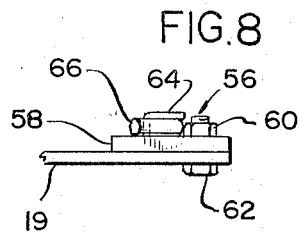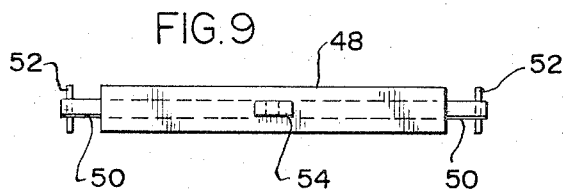

United States Patent Office 3,378,279
Patented Apr. 16, 1968

3,378,279
HITCH MEANS FOR FARM IMPLEMENT
Carl M. Jacobs, Decatur, Ill., assignor to Fryco Manufacturing Co., Inc., a corporation of Illinois
Filed May 13, 1966, Ser. No. 549,937
9 Claims. (Cl. 280—461)

ABSTRACT OF THE DISCLOSURE

A hitch for connecting the lift mechanism of a tractor to a towed vehicle characterized in that the hitch includes a pivotally connected tongue at the rear, a pair of spaced pivotal connections at the front, and a depending link pivoted at one end of the hitch and having a pivoted connection means at the free end so that the hitch may be connected to a towed vehicle and to the three point lift mechanism at the rear of a tractor, with the towed vehicle remaining at a constant elevational attitude during raising and lowering of the tractor lift mechanism.

This invention relates to an improvement in hitches and more particularly to a novel hitch arrangement for connecting a towed vehicle with the rear of a farm tractor in such a manner that raising and lowering of lift mechanism at the rear of the farm tractor will not affect the elevational disposition of the towed vehicle.

Frequently a farm tractor is utilized to pull a wagon-type vehicle while performing a function in the field. Often these towed vehicles are tandem axle wagons. It is also not uncommon for auxiliary equipment to be attached to the tractor or towed vehicle to operate in conjunction with these vehicles in performing some agricultural function.

For example, it has been common practice to apply fertilizer in liquid form to the soil. One such means of applying liquid fertilizer is through the use of fluid lines which are connected to knives that extend downwardly from a generally horizontal mounting bar so that the knives dig into the ground as the tractor or trailer to which the bar is mounted is pulled over the ground. The wagon vehicle which is also connected to the tractor may be utilized to supply the liquid fertilizer which is dispensed through the lines that are connected to the knives. It is desirable to be able to secure the knife bearing or tool bar structure which supports the liquid fertilizer lines to the lift mechanism at the rear of the tractor so that the tool bar may be selectively lifted from, and placed into engagement with, the soil at the command of the tractor operator. The wagon bearing the liquid fertilizer tank should be connected to the tractor in such a fashion as to be undisturbed by the raising and lowering of the tool bar structure.

This invention is directed to an improved hitch for connecting the wagon to the lift mechanism of a tractor or to components connected to the lift mechanism, the hitch being constructed and arranged to permit raising and lowering of the tractor lift mechanism without raising or lowering the towed vehicle.

It is therefore a primary object of this invention to provide a novel hitch structure for farm implements.

It is another object of this invention to provide a novel hitch for farm implements for connecting a towed vehicle to the rear of a tractor in such a fashion as to permit raising or lowering of the tractor lift mechanism without changing the horizontal disposition of the towed vehicle.

Still a further object of this invention is to provide a novel hitch structure for farm implements, the hitch structure being constructed and arranged to afford connection of a towed vehicle to a farm tool secured at the rear of the lift mechanism of a farm tractor, so that raising and lowering of the lift mechanism to raise and lower the farm tool will not change the horizontal disposition of the towed vehicle connected to the opposite end of the hitch.

Other objects, features and advantages of the present invention will be apparent from the following description of the preferred embodiments illustrated in the accompanying drawings, in which:

FIGURE 1 is a fragmentary perspective view, partially in phantom outline, showing a tool bar structure connected to the rear of a tractor and showing the hitch of this invention connected to the tool bar structure and the rear of the tractor;

FIGURE 2 is a diagrammatic side elevational view showing a farm tractor having a tool bar connected at the rear thereof and showing the hitch of this invention connecting a towed wagon to the tractor and the tool bar;

FIGURE 3 is a view similar to FIGURE 2 showing the tool bar raised by the tractor lift mechanism relative to the position shown in FIGURE 2 and further showing the towed vehicle maintaining its horizontal attitude;

FIGURE 4 is a perspective view of a link element utilized to connect the hitch of this invention with the draw bar at the rear of a farm tractor;

FIGURE 5 is a top plan view of the hitch of this invention;

FIGURE 6 is a side elevational view of the hitch of this invention with the top cross braces removed for clarity of illustration;

FIGURE 7 is a fragmentary top plan view of the draw bar of a tractor having a draw bar hitch assembly secured thereto for facilitating connection of the hitch of this invention by means of the link shown in FIGURE 4;

FIGURE 8 is a side elevational view of the structure shown in FIGURE 7; and

FIGURE 9 is a rear elevational view of the rear pull bar of the hitch of this invention.

As best shown in FIGURES 2 and 3, the hitch means 10 of this invention is utilized to connect a tractor or prime mover 12 to a wagon or towed vehicle 14 so that constant load will be maintained on all four wheels 14a of the tandem axle wagon. The hitch may be connected at one end to a tool bar or farm tool 16 or directly to the tractor, and at the other end to a connecting pin 17 at the forward end of wagon 14. Tool bar 16 is attached to tractor lift assembly 18 at the rear of the tractor. In addition, hitch 10 is connected to tractor draw bar 19.

Tool bar 16 is a generally horizontal structure supporting knife elements 20 (one being shown in phantom outline in FIGURE 1 for clarity of illustration of the other parts of the tractor lift assembly and hitch means of this invention). Generally fluid lines 22 are utilized for conducting liquid fertilizer from a supply source to the ground. These fluid lines are secured along knife elements 20 and run from a nurse tank 24 which may be located on wagon 14.

The tool bar 16 may be further provided with supporting or outrigger wheels 26 which aid in maintaining the stability of bar 16. Tool bar 16 is also provided with spaced generally parallel downwardly extending plates 28, each of which have a rearwardly extending mounting means or forked portion 29. In addition, the tool bar is provided with an upwardly projecting bridge 30 which also supports a generally forwardly upwardly extending connecting means or fork 32.

Tractor lift assembly 18 is a standardized universal three point structure having two lifting arms 34 which are pivoted to the tractor and connected by arms 36 to suitable actuating means, such as a piston and cylinder device (not shown). The tool bar plates 28 are pivoted at 37 to the lifting arms 34 so as to raise and lower the tool bar responsive to raising and lowering of the arms 34.

In addition, the lift assembly 18 includes an idler arm 38 positioned generally centrally of, and above the lift arms 34, and also pivoted to the tractor. This idler arm is pivoted at 39 to connecting fork 32 on the top of tool bar 16 to lend stability to the lifting structure.

Preferably, it is desirable that during operation the tool bar be capable of being raised and lowered as the tractor makes pass after pass back and forth across a field. However, the raising and lowering of the tool bar should be done without shifting the load on the wheels of wagon 14. To this end, the hitch means 10 of this invention is directed.

Hitch 10 includes spaced generally non-parallel forwardly and rearwardly extending pull links 40 As best seen in FIGURE 5, these links are spanned and braced by cross bracing arms 42 connected to each other in an X configuration in plan at 42a, and connected to the pull links at the several points 42b. The forward and rear end of each pull link 40 has an outwardly extending collar 44 which has a generally central opening 46 for receiving a pin-like element to pivotally connect the hitch means to other structure, such as at 47 to the fork 29 on each plate 28 of tool bar 16.

The rear of hitch means 10 includes a rear pull bar 48 which spans the distance between the two pull links 40. Pull bar 48 is provided with outwardly extending shaft means 50 for insertion into openings 46 of collars 44 at the rear end of each of the links 40. The links 40 are retained on the shaft 50 of pull bar 48 by retaining means, such as a cotter key, which extends through an opening 52 in shaft 50 outside of each of the collars 44. The connection of links 40 to pull bar 48 permits the hitch means to pivot relative to its rear portion as defined by pull bar 48.

Pull bar 48 further includes a centrally positioned rearwardly extending tongue 54 having an opening 54a to provide a means for connecting the hitch to the connecting pin 17 of wagon 14.

A draw bar hitch assembly 56 is connected to draw bar 19 to provide a means for securement of the hitch assembly to the draw bar. Draw bar hitch assembly 56 includes a generally flat plate 58 having a nut 60 at one end for reception of a bolt 62 threaded through an opening in the draw bar 19 and an aligned opening in plate 58 (not shown) for attaching the plate to the draw bar. An L-shaped bracket 64 overhangs the plate opposite nut 62. A generally V-shaped bar 66 is held in the L-shaped bracket 64, opposite ends of the bar having openings 66a for reception of a fastening means such as a key or the like.

The underside of each of the pull links 40 is provided with a pitch control link connecting bracket 68. Each bracket 68 comprises spaced plates 70 and a pin 72 which spans the plates 70 providing a means for pivotally connecting pitch control link 74 to the opposite sides of hitch means 10.

As best shown in FIGURE 4, pitch control link 74 includes a body 76 and spaced end portions 78 which are threadable relative to body 74 to adjust the length of the link. The free ends of the portions 78 are provided with collars 80 having openings 82. One end of each link is secured to the underside of hitch 10 with pins 72 extending through openings 82 in collars 80. The other end of each link is secured to draw bar 19 with bar 66 extending through openings 82 and a suitable key or fastening means extending through openings 66a in bar 66.

In operation, as the lift mechanism 18 of the tractor is actuated to raise the tool bar 16, hitch means 10 pivots about its connections 47 with each fork 29 and at the same time pivots about its rear draw bar 48 to change its elevational attitude. In addition, pitch control links 74 pivot at their opposite ends. However, there is no change in the horizontal disposition of wagon 14. As best shown in FIGURES 2 and 3, the only effect that the raising and lowering of the tool bar 16 has upon wagon 14 is to cause the wagon to be pulled relatively closer to the tractor.

The hitch means of this invention provides a structure for connection of a towed vehicle to the lift mechanism of a prime mover by direct connection of links 40 to arms 34; or to a tool connected to the lift mechanism, so that the lift mechanism may be raised and lowered without changing the elevational disposition of the towed vehicle. This is extremely useful, in that the tractor operator retains elevational control of the tool connected to the lift mechanism without loosing stability of the towed wagon. The structure of the hitch is relatively simple, rendering it economical to produce, and the elements of its design and structure are universally adaptable to a wide variety of other implements and mechanisms in addition to the specific application shown herein.

The foregoing detailed description has been given for clearness of understanding only, and no unnecessary limitations should be understood therefrom, as some modifications may be obvious to those skilled in the art.

I claim:

1. A hitch means for connecting the lifting mechanism of a prime mover to a towed vehicle in such a fashion as to permit raising and lowering of the lifting mechanism without changing the elevation of the towed vehicle comprising: a frame having a pair of spaced pivotal connections at one end for connection to the lifting arms of the lifting mechanism of a prime mover; a pivoted towed vehicle connection at the other end of the frame; and a pitch control link pivoted at one end to the frame intermediate the ends of the frame and having at its other end means for pivotally connecting the link to a rearwardly projecting element of a prime mover; whereby raising and lowering of the prime mover lift mechanism will not change the elevational attitude of a towed vehicle connection to the hitch means.

2. The hitch means of claim 1 wherein the frame comprises a pair of spaced link elements having collars on one end providing the pivotal connection to the lift arms of a prime mover.

3. The hitch means of claim 2 wherein the links also are provided with collars on the opposite ends and pivotally support a cross bar having a rearwardly projecting tongue thereby providing the pivoted towed vehicle connection at the opposite end of the frame.

4. The hitch means of claim 3 wherein the links and cross bar are formed in a generally rectangular configuration with cross bars spanning the links forming braces from which the pitch control link depends.

5. A hitch means for connecting the lifting mechanism of a prime mover to a towed vehicle to permit raising and lowering of the lifting mechanism without changing the elevation of the towed vehicle, comprising: a pair of pull links each having collars at the opposite ends thereof; a pull bar spanning one end of the links, including shaft portions which extend outwardly from opposite ends of the bar and through the collars, the pull bar having a rearwardly extending hitch tongue to provide a means for pivotally connecting the end of the hitch to a towed vehicle; and pitch control link means pivoted at one end to the pull links and having at the other end pivotal connection means for pivotal attachment to the draw bar of a tractor; connection of the collars at the other end of hte links to prime mover lift mechanism permitting the towed vehicle to maintain its original elevational attitude during raising and lowering of the tractor lift mechanism.

6. The hitch means of claim 5 wherein the underside of each of the pull links is provided with a pitch control link connecting means including a pivot pin and wherein the pitch control link is provided with eye means at its opposite ends for pivotal securement to the hitch means and to a tractor draw bar.

7. The hitch means of claim 6 including a tractor draw bar hitch assembly comprising a member having an arm bent intermediate its ends with free end portions constructed and arranged for pivotal connection to the eye of the pitch control link, said member having a base portion adapted for securement to the draw bar of a tractor structure to connect the pitch control links thereto.

8. A hitch construction for connecting a towed vehicle to mechanism movably mounted for up and down movement to differing positions of elevation on a prime mover without substantial change in the elevation of the towed vehicle connection to the hitch regardless of the position of said mechanism comprising, a hitch frame having a towed vehicle connection at a trailing end thereof, pivotal connection means at the forward end of the hitch frame to pivotally connect the frame to said mechanism for movement therewith, and link means pivoted at one end to the hitch frame intermediate the ends thereof and having pivotal connection means at the other end for pivotal connection to the prime mover, whereby the towed vehicle connection remains at generally the same level upon raising of said mechanism as the elevational disposition of the hitch frame changes resulting from movement of the hitch frame and link means about their pivots.

9. The hitch construction of claim 8 wherein the towed vehicle connection comprises a bar member pivoted to the frame for movement in a plane parallel to or coincident with the pivotal connection of the hitch frame to the prime mover, said bar having means for connecting the hitch frame to a towed vehicle.

References Cited

UNITED STATES PATENTS

| | | | |
|---|---|---|---|
| 2,514,614 | 7/1950 | Von Schlegell | 280—479 X |
| 3,062,563 | 11/1962 | Pearce | 280—461 |
| 3,096,998 | 7/1963 | Stadelman | 280—490 X |
| 3,218,999 | 11/1965 | Pattison | 111—7 |
| 3,295,482 | 1/1967 | Dountas et al. | 111—7 |

LEO FRIAGLIA, *Primary Examiner.*

UNITED STATES PATENT OFFICE
CERTIFICATE OF CORRECTION

Patent No. 3,378,279                    April 16, 1968

Carl M. Jacobs

It is certified that error appears in the above identified patent and that said Letters Patent are hereby corrected as shown below:

In the heading to the printed specification, lines 3 and 4, "Fryco Manufacturing Co., Inc." should read -- Tryco Manufacturing Co., Inc. --.

Signed and sealed this 19th day of August 1969.

(SEAL)
Attest:

Edward M. Fletcher, Jr.              WILLIAM E. SCHUYLER, JR.
Attesting Officer                      Commissioner of Patents